United States Patent [19]

East

[11] 4,103,164
[45] Jul. 25, 1978

[54] RADIACMETER WITH NULL DEFLECTION SYSTEM

[75] Inventor: Philip C. East, Ottawa, Canada

[73] Assignee: Her Majesty the Queen in right of Canada, as represented by the Minister of National Defence, Canada

[21] Appl. No.: 759,580

[22] Filed: Jan. 14, 1977

[30] Foreign Application Priority Data

Mar. 9, 1976 [CA] Canada ................................... 247484

[51] Int. Cl.² .............................................. G01T 1/18
[52] U.S. Cl. ..................................... 250/374; 250/370
[58] Field of Search ................ 250/370, 371, 374, 375

[56] References Cited

U.S. PATENT DOCUMENTS

| | | |
|---|---|---|
| 3,539,809 | 11/1970 | Lokerson ............................. 250/370 |
| 3,878,496 | 4/1975 | Erickson ........................... 250/374 X |
| 3,984,690 | 10/1976 | Marshall et al. ..................... 250/374 |

Primary Examiner—Archie R. Borchelt
Attorney, Agent, or Firm—Lowe, King, Price & Markva

[57] ABSTRACT

A portable gamma radiation dose rate meter suitable for use over 3 or 4 decades over the dose rate range 0.1 mR/hr and 1000 R/hr which incorporates an ion chamber or other radiation detector and a null deflection readout system using a calibrated potentiometer and two single light emitting diodes as high and low indicators.

9 Claims, 4 Drawing Figures

Q9 : 2N1309
Q(10,11) : MPQ6501
A₁ : RC4132
ZD : 1N4735

RADIACMETER WITH NULL DEFLECTION SYSTEM

This invention relates to a portable gamma radiation dose-rate meter (Radiacmeter) and more particularly to a radiacmeter having a flashing light null deflection readout system.

This application is related to my copending U.S. application Ser. No. 759,579 filed concurrently herewith and entitled "Radiacmeter With Flashing Light Readout".

In a nuclear war combat troops and others may be exposed to high levels of gamma radiation from nuclear weapons' fallout. The highest levels and consequently the greatest hazard, would clearly exist during the first day or so after an enemy attack when there would be little, if any, dose-rate information available to individual soldiers or other personnel, unless each is equipped with a personal dose-rate meter. A dosimeter is of little value in such a situation as these instruments are merely a cumulative measure of radiation received. Such instruments are, therefore, "after-the-event" devices only. Dose-rate levels may vary by large factors due to local conditions so that, even in an area which has been surveyed and assumed to be safe, an individual or small group could locate in a "hot-spot", and it is, therefore, most desirable that all such troops and other personnel be equipped with a simple, light and reliable dose-rate meter in order to be able to evaluate the dose-rate to which personnel might be exposed so as to enable appropriate steps to minimize the hazard to be taken, and thus reduce the inevitable casualties.

High range radiacmeters currently in service, such as the IM108B presently used by the Canadian Armed Forces, are relatively large, heavy and cumbersome and would impose too great a penalty on combat troops if issued on a large scale. Further the readout on presently available instruments is generally a conventional moving coil microammeter which is relatively expensive to produce and relatively fragile. Attempts have been made to construct a moving coil microammeter which is suitable for rugged service but such attempts have not been entirely successful, as the resulting instrument is necessarily very bulky and costly to produce.

It has been suggested that a detector with a digital readout might be employed, but the circuitry required is complex and expensive and, more importantly, the power requirements are too high, for reasonable life under normal operating conditions, to be able to use readily available 1.5 volt dry cells of the 'C' or 'D' flashlight type.

It is an object, therefore, of the present invention to provide a rugged low cost radiacmeter which is suitable for use over 3 to 4 decades in the dose-rate range 0.1mR – 1000R/hr, and which incorporates a radiation detector such as an ion chamber detector, a null deflection system using a calibrated potentiometer and two single light-emitting diodes as low and high indicators.

Thus by one aspect of this invention there is provided a self contained gamma radiation dose-rate meter, adapted to be hand held and comprising:
a substantially rigid, pocket sized casing which contains
 a power supply means;
a radiation detection means which generates an output voltage in the presence of an ionizing radiation and
 which is operatively connected to said power supply;
means to amplify said output voltage;
means to compare said amplified output voltage against
 a reference voltage;
visual means adapted to indicate high and low comparison readings, thereby defining a null deflection readout system.

The invention will be described in more detail hereinafter with reference to the drawings in which.

Figure 1:
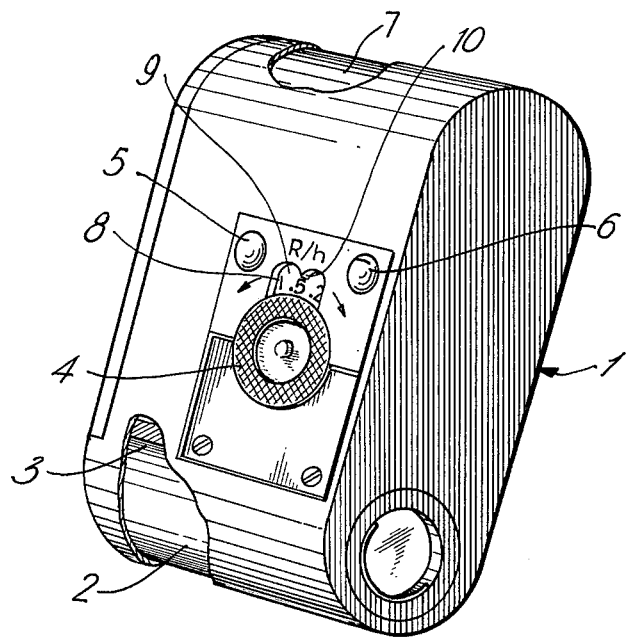
FIG. 1 is an isometric view, partly broken away, showing an instrument according to one embodiment of this invention.

Turning firstly to FIG. 1 there is shown an instrument according to the present invention which comprises a case or housing 1 which contains the electronic circuitry and the power supply. The case, which typically measures $4\frac{1}{4}$ inches $\times$ $2\frac{1}{2}$ inches $\times$ $1\frac{1}{2}$ inches, may be fabricated in any suitable material such as a thermoplastic or thermosetting plastic moulding or, more preferably, an aluminum die casting. The case is dimensioned to accommodate a battery 2, either a 'C' or 'D' size 1.5 volt dry cell, in a separate compartment 3, and the complete instrument generally weighs about 12 ounces, including batteries. The case is provided with a circular, knurled, potentiometer-adjusting knob 4 which incorporates a scale 8 and which also controls the instrument's ON-OFF switch. Scale 8 is visible through a window 9 in the case which is provided with a scale reference point 10. Two light emitting diodes 5 and 6 which act as high and low indicators of the null deflection system, are also provided in the case.

Figure 2:
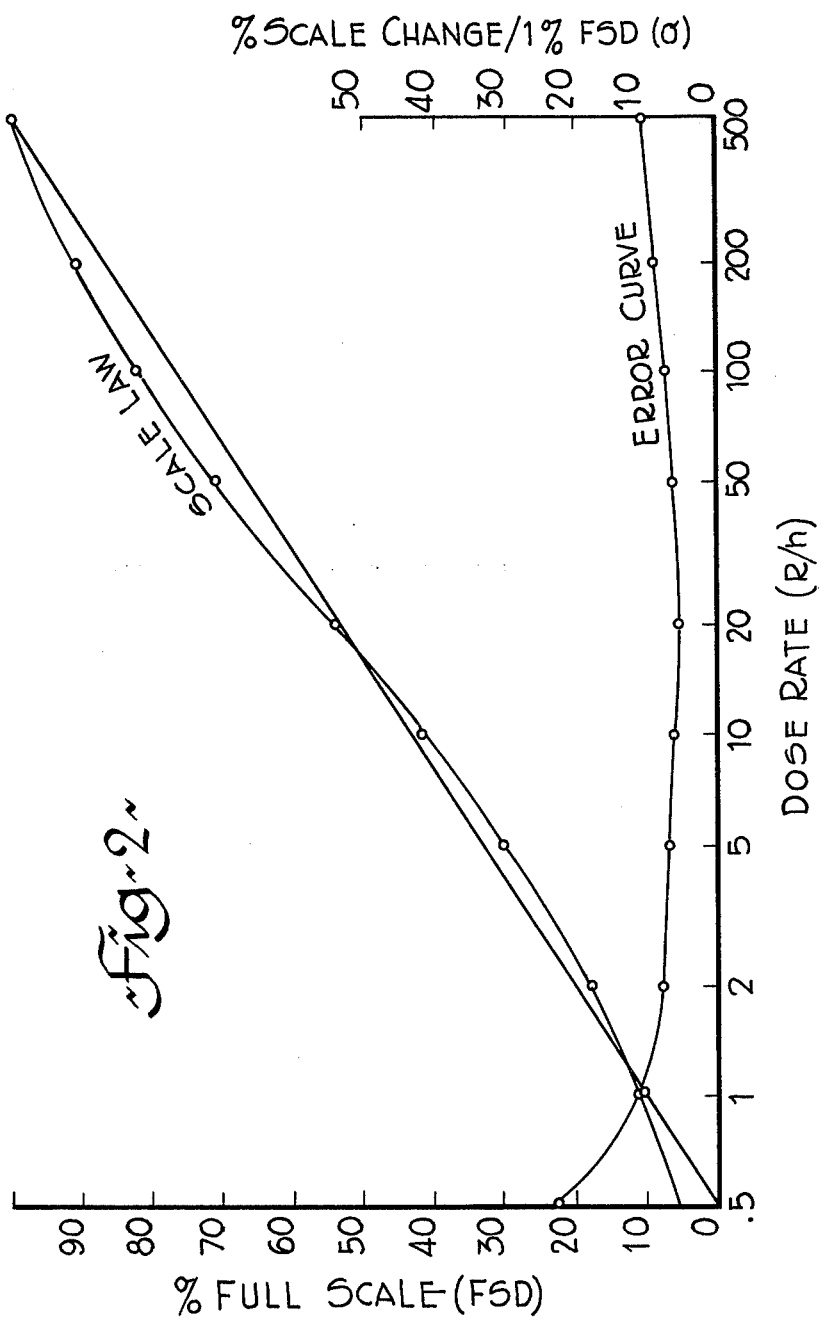
FIG. 2 is a graph of the scale law of a detector used in the present invention.

The ionizing radiation detector preferred for the present invention is a 25 cc ion chamber 7, operated in the unsaturated region which provides a suitable response to the readout system in a dose-rate range 0.5 to 500 R/hr. It will be appreciated however that other radiation detectors such as Geiger-Mueller tubes or solid state detectors such as a silicon diode may be used for this and other dose-rate ranges, particularly in the 1.0 – 100 mR/hr range. An ion chamber is too large for portable use below about 0.1 R/hr and would not therefore normally be used at such low levels. In order to keep size to a minimum it is preferred that case 2 be of metal construction so that the outer electrode of the chamber 7 is part of the instrument case. This is a relatively inexpensive method of construction, assembly is simplified and a connection to the outer electrode, through the chamber base plate, is not required. It will be appreciated that the electrometer transistor and load resistor are mounted in the chamber base plate. In order to provide a satisfactory energy response, the preferred aluminum outer electrode should be provided with a plastic liner approximately 0.05 inch thick which covers about three quarters of the outer electrode. The electrode area adjacent to the inside of the case is not normally covered. With a $1.5 \times 10$ inches ohm load resistor, chamber 7 covers the dose rate range 0.5 – 500 R/hr on a quasi-logarithmic scale which varies only slightly from the ideal, straight line logarithmic scale law, as shown more clearly in FIG. 2, which also shows the scale error curve plotted against the slope of the scale law in percent scale reading for 1% full scale deflection (FSD). For full scale deflection, the voltage across the load resistor at 500 R/hr is two volts and therefore 1% FSD is 20 millivolts.

Figure 3:
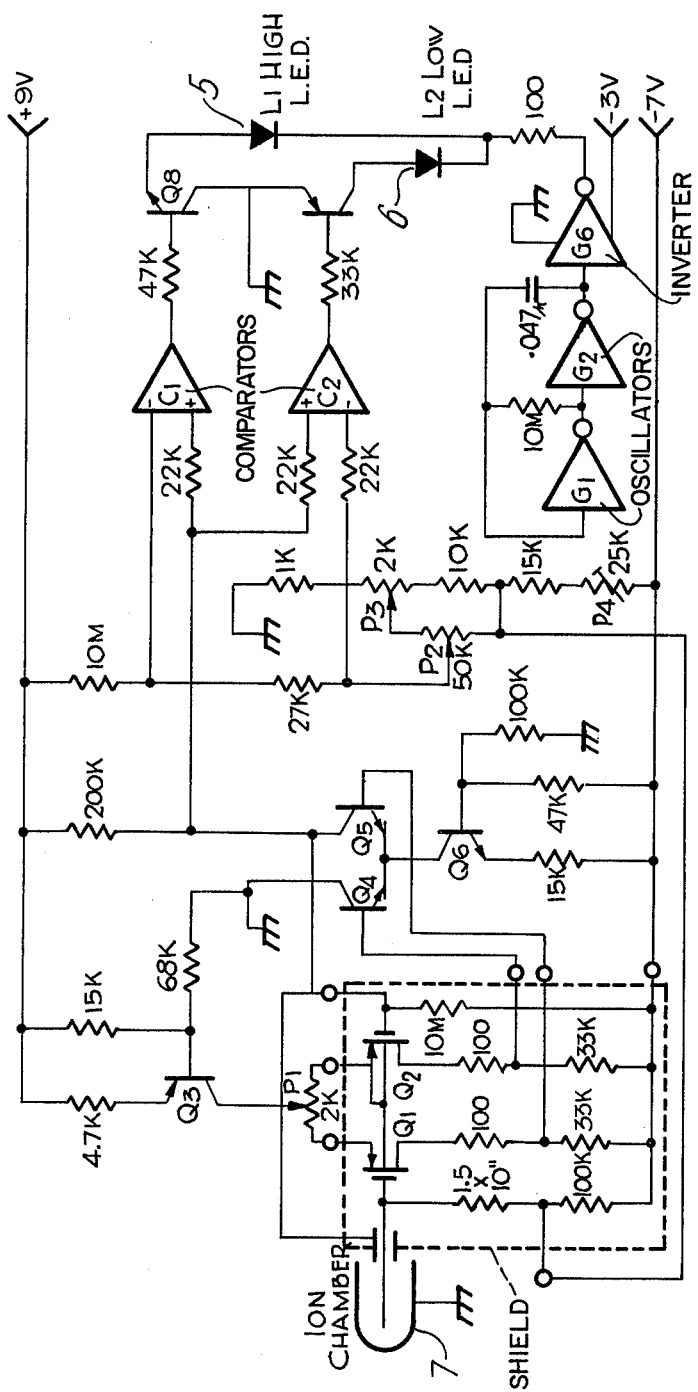
FIG. 3 is a circuit diagram of the detector, amplifier, potentiometer and readout circuits of the embodiment of the invention shown in FIG. 1.

The amplifier and readout circuitry is contained within the case 1 and the circuit diagram therefor is shown schematically in FIG. 3.

The detector 7 is coupled to the readout by a two stage differential amplifier connected as a voltage follower. The first stage is a dual P-channel enhancement-mode insulated-gate field-effect transistor. Since the outer electrode of the ion chamber is at common case potential the amplifier input and hence the chamber centre electrode, are offset to −2.5 volts. The chamber energizing voltage, the voltage between the chamber electrodes, is 2.5 volts.

The amplifier output is fed to two comparators, C1 and C2, which compare the signal voltage to the voltage at the wiper of the scale potentiometer P2. The comparator inputs from P2 are offset a nominal 25 millivolts. At balance, when the amplifier output is between 1 and 24 millivolts higher than the voltage at the wiper of P3, C1 output is negative and C2 output is positive and both light-emitting diodes (LED's), L1 and L2, are off.

If, by adjustment of P1, the amplifier output is initially offset 12 millivolts from the potentiometer voltage, then the potentiometer can be set to within ± 12 millivolts of the amplifier output. In practice, the potentiometer voltage will usually be set to within ± 5 millivolts of the amplifier output or ± ¼% FSD., so that over most of the scale (see FIG. 2) the scale will be set to within ±2% of the true reading.

The chamber energizing voltage, which is the same as the voltage across the scale potentiometer P2, must be the same for all instruments. This voltage is derived from the −7 volt supply and is set to −2.5 volts by adjustment of P4, with P3 set to its mid-position. A suitable potentiometer is a Spectral Model No. 140. This potentiometer is wire wound and has a standard linearity of ± 1%. This offers a useful improvement in scale accuracy over the MIL approved meter used in portable instruments which has a ± 2% linearity.

The instrument is calibrated by adjusting P3 so that the instrument reads correctly in a 200 R/hr field.

An oscillator G1, G2, drives an inverter G6 (four of the six inverters on one chip are connected in parallel) which switches the −3 volt supply to the LED's so that when "on", either L1 or L2 flashes at a rate of approximately once per second.

The amplifier zero is preset and no operator adjustment is available, thus any offset in the amplifier will introduce an error across the whole scale. Experience with this circuit has shown, however, that zero drift at constant temperature after one or two minutes "warm up" is less than one or two millivolts and can be ignored.

It should be noted that any instrument using a microammeter with a log scale should preferably incorporate a zero adjustment. Assuming no electronic zero drift, shock or vibration may produce a mechanical zero offset resulting in significant scale errors. The aging of components may also introduce scale errors, however it is assumed that these will be limited by annual maintenance checks.

The output voltage from an ion chamber, operating in the unsaturated region, is proportional to the chamber energizing voltage. If the scale potentiometer voltage and the chamber energizing voltage are derived from the same supply voltage then any errors due to variations in the supply voltage will tend to cancel and the circuit is relatively insensitive to supply voltage variation.

Similarly, with a Geiger-Mueller tube debitor compensation is obtained between the count-rate circuit voltage and the potentiometer voltage.

In the IM108B instrument of the prior art changes in the zero can and will occur but the errors can be eliminated by correct adjustment of the zero control. In practice, particularly at low temperatures, a required adjustment may not be made or may not be made accurately. Thus by eliminating the zero control and limiting zero drift an improvement in overall performance is obtained.

Figure 4:
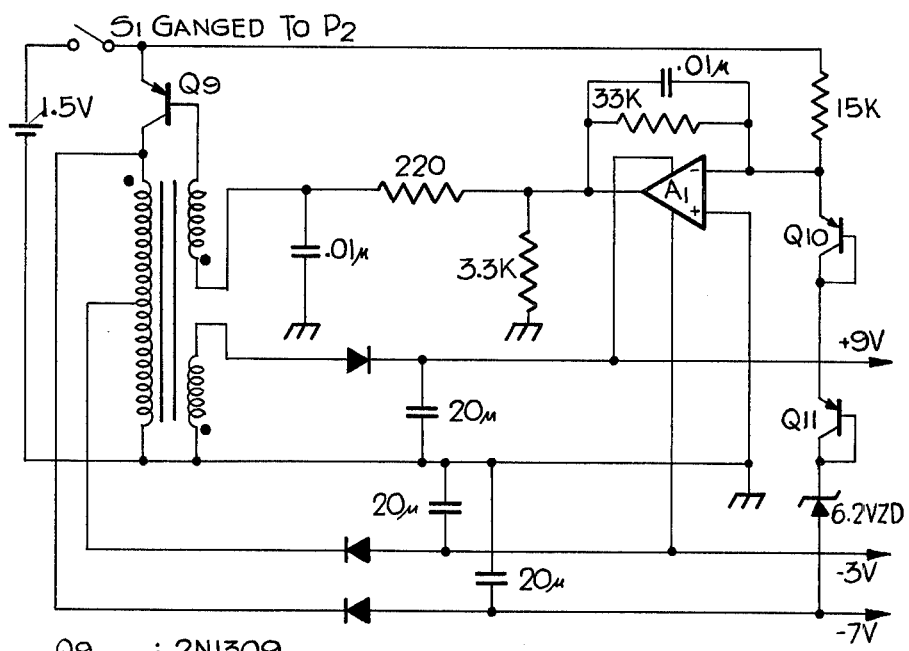
FIG. 4 is a circuit diagram of the power supply of the embodiment of the invention shown in FIG. 1.

The circuit diagram of the power supply is shown in FIG. 4. A swinging choke converter, Q9, provides the required circuit operating voltages from a single "C" size battery. The −7 volt output voltage is clamped to the zener diode voltage by the operational amplifier A1 which controls the base drive of Q9. The voltages of the −3 volt and 9 volt supplies are directly related to the −7 volt output by the turns ratios of the windings. Transistors Q7 and Q8, strapped as diodes are connected in series with the zener diode to provide temperature compensation. This combination has a temperature coefficient of −0.02 to −0.04%/° C. At constant temperature the −7 volts will vary less than ± 1% for battery voltages from 0.9 volts to 3 volts. The maximum change in output voltage with change in temperature will be between +1 to +3% at −40° C.

Battery current drain varies from about 15 milliamps, full battery voltage and LED's off, to 80 milliamps with the battery down to 0.9 volts and an LED flashing. A zinc-carbon cell will provide from 50 to 100 hours of operation at moderate temperatures. It will not operate at low temperatures. A manganese alkaline cell should give up to 200 hours operation at moderate temperatures and from 20 to 30 hours at −40° C. A lithium cell will give 200 to 300 hours of operation; this operating time is virtually independent of temperature.

It will be appreciated that this invention has been described with particular reference to the use of an ion chamber detector which is particularly suitable at ranges between 0.5 to 500 R/hr. Ion chambers are not normally suitable below 0.1 R/hr for reasons of portability and it is unlikely that they would be required above 1000 R/hr but a 4 decade counter on the ion chamber principle could be fabricated without undue difficulty. At low levels of radiation, however, the detector would normally be a Geiger-Mueller tube or a solid state device. As more fully described in my copending application referred to above, a Geiger-Mueller tube No. 18503 is particularly suitable in a 3 decade counter operative between 0.1 to 100 mR/hr.

I claim:

1. A hand held self contained gamma radiation dose-rate meter comprising: a substantially rigid, pocket sized casing which contains:
   (a) power supply means;
   (b) radiation detection means which generates an output voltage in the presence of an ionizing radiation and quasi-logarithmically proportional thereto, operatively connected to said power supply means;
   (c) means to amplify said output voltage;
   (d) linear potentiometer means to compare a reference voltage provided thereby with said output voltage; and (e) visual means to indicate high and low comparison readings, viewable externally of said casing, thereby defining a null deflection readout system.

2. A dose-rate meter as claimed in claim 1 wherein said power supply means comprises a 1.5 volt dry cell.

3. A dose-rate meter as claimed in claim 1 wherein said radiation detection means is an ion chamber operated in an unsaturated region.

4. A dose-rate meter as claimed in claim 1 wherein said visual means comprise two single light emitting diodes.

5. A dose-rate meter as claimed in claim 1 wherein said radiation detection means is selected from the group consisting of an ion chamber, a Geiger-Mueller tube and a solid state device.

6. A dose-rate meter as claimed in claim 1 wherein said case is an aluminum die cast case.

7. A dose-rate meter as claimed in claim 1 wherein said radiation detection means is an ion chamber adapted to respond to ionizing radiations in the range 0.5 to 500 R/hr.

8. A dose-rate meter as claimed in claim 4 including oscillator means operatively connected to each of said light emitting diodes so that, when on, a light emitting diode flashes at a rate of approximately one flash per second.

9. A dose-rate meter as claimed in claim 1 wherein said potentiometer includes a visible dial readout scale.

* * * * *